US012646784B2

(12) United States Patent (10) Patent No.: US 12,646,784 B2
Iwaki et al. (45) Date of Patent: Jun. 2, 2026

(54) ELECTRIC POWER TOOL

(71) Applicant: MAX CO., LTD., Tokyo (JP)

(72) Inventors: Kozo Iwaki, Tokyo (JP); Norihiro Nagai, Tokyo (JP); Takahiro Hashimoto, Tokyo (JP)

(73) Assignee: Max Co., Ltd., Tokyo (JP)

( * ) Notice: Subject to any disclaimer, the term of this patent is extended or adjusted under 35 U.S.C. 154(b) by 570 days.

(21) Appl. No.: 18/131,978

(22) Filed: Apr. 7, 2023

(65) Prior Publication Data

US 2023/0327262 A1 Oct. 12, 2023

(30) Foreign Application Priority Data

Apr. 8, 2022 (JP) ................................. 2022-064772

(51) Int. Cl.
*H01M 50/247* (2021.01)
*B25F 5/00* (2006.01)
*H01M 10/42* (2006.01)

(52) U.S. Cl.
CPC ............. *H01M 50/247* (2021.01); *B25F 5/00* (2013.01); *H01M 2010/4271* (2013.01)

(58) Field of Classification Search
None
See application file for complete search history.

(56) References Cited

U.S. PATENT DOCUMENTS

| | | | |
|---|---|---|---|
| 8,813,866 B2 | 8/2014 | Suzuki | |
| 2008/0304199 A1* | 12/2008 | Cruise | H01M 10/4207 |
| | | | 361/101 |
| 2012/0293096 A1 | 11/2012 | Mizoguchi et al. | |
| 2013/0277078 A1 | 10/2013 | Wallgren | |

FOREIGN PATENT DOCUMENTS

| | | |
|---|---|---|
| JP | 2005057566 A | 3/2005 |
| JP | 2013538700 A | 10/2013 |
| JP | 2017-064858 A | 4/2017 |
| JP | 2020015125 A | 1/2020 |
| JP | 2020163568 A | 10/2020 |
| WO | 2020021728 A1 | 1/2020 |
| WO | 2020194676 A1 | 10/2020 |
| WO | 2021064860 A1 | 4/2021 |

OTHER PUBLICATIONS

JP2020015125A machine translation (Year: 2025).*
WO2020194676A1 machine translation (Year: 2025).*
Sep. 7, 2023—(EP) Extended Search Report—App 23167377.3.

* cited by examiner

*Primary Examiner* — Brian R Ohara
*Assistant Examiner* — M. T. Leonard
(74) *Attorney, Agent, or Firm* — Banner & Witcoff, Ltd.

(57) ABSTRACT

There is provided an electric power tool including: an electric motor; a first battery; a second battery; a first controller configured to control the electric motor at a first operating voltage supplied based on a first power supply voltage supplied from the first battery; a communication device; and a second controller configured to control the communication device at a second operating voltage supplied based on the first power supply voltage supplied from the first battery, and configured to control the communication device at the second operating voltage supplied based on a second power supply voltage supplied from the second battery when the first power supply voltage is not supplied from the first battery. The second controller is configured to execute a reset operation when a predetermined condition is satisfied.

8 Claims, 4 Drawing Sheets

ELECTRIC POWER TOOL

CROSS-REFERENCE TO RELATED APPLICATIONS

This application is based on Japanese Patent Application No. 2022-064772 filed on Apr. 8, 2022, the contents of which are incorporated herein by way of reference.

TECHNICAL FIELD

The present invention relates to an electric power tool.

BACKGROUND ART

In recent years, there is an electric power tool improved in convenience by mounting a wireless communication device on a main body of the electric power tool.

Patent Literature 1 discloses such an electric power tool on which a wireless communication device is mounted. The electric power tool includes an electric motor, a communication device for performing wireless communication, and a controller for controlling the electric motor and the communication device.

Patent Literature 1: JP2017-064858A

In the electric power tool disclosed in Patent Literature 1, since the controller controls the electric motor and the communication device, when the controller performs communication, the communication may be affected by noise caused by the electric motor. In addition, since it is essential for the controller to perform communication while controlling the electric motor, the controller cannot perform communication in real time.

Therefore, an object of the present invention is to provide an electric power tool that is less likely to be affected by noise and that can perform communication in real time.

SUMMARY OF INVENTION

There is provided an electric power tool including a power supply device for the electric power tool. The power supply device for the electric power tool includes: a first controller configured to control an electric motor mounted in the electric power tool at a first operating voltage supplied based on a first power supply voltage supplied from a first battery; and a second controller configured to control a communication device mounted in the electric power tool at a second operating voltage supplied based on the first power supply voltage supplied from the first battery, and configured to control the communication device at the second operating voltage supplied based on a second power supply voltage supplied from a second battery when the first power supply voltage is not supplied from the first battery. The second controller is configured to execute a reset operation when a predetermined condition is satisfied.

The "electric power tool" of the present invention refers to a tool that uses electricity as a power source and that is used for work such as machining. The "electric power tool" of the present invention includes, in addition to a product used alone, a component or a module that constitutes a part of another device. For example, the "electric power tool" of the present invention may be a module attached to equipment such as a robot arm. Further, the "electric power tool" of the present invention may be a component constituting a part of a machine tool having a plurality of functions.

DESCRIPTION OF EMBODIMENTS

Hereinafter, embodiments of the present invention will be described with reference to the drawings. The following embodiments are examples for explaining the present invention, and it is not intended to limit the present invention only to the embodiments.

Figure 2:
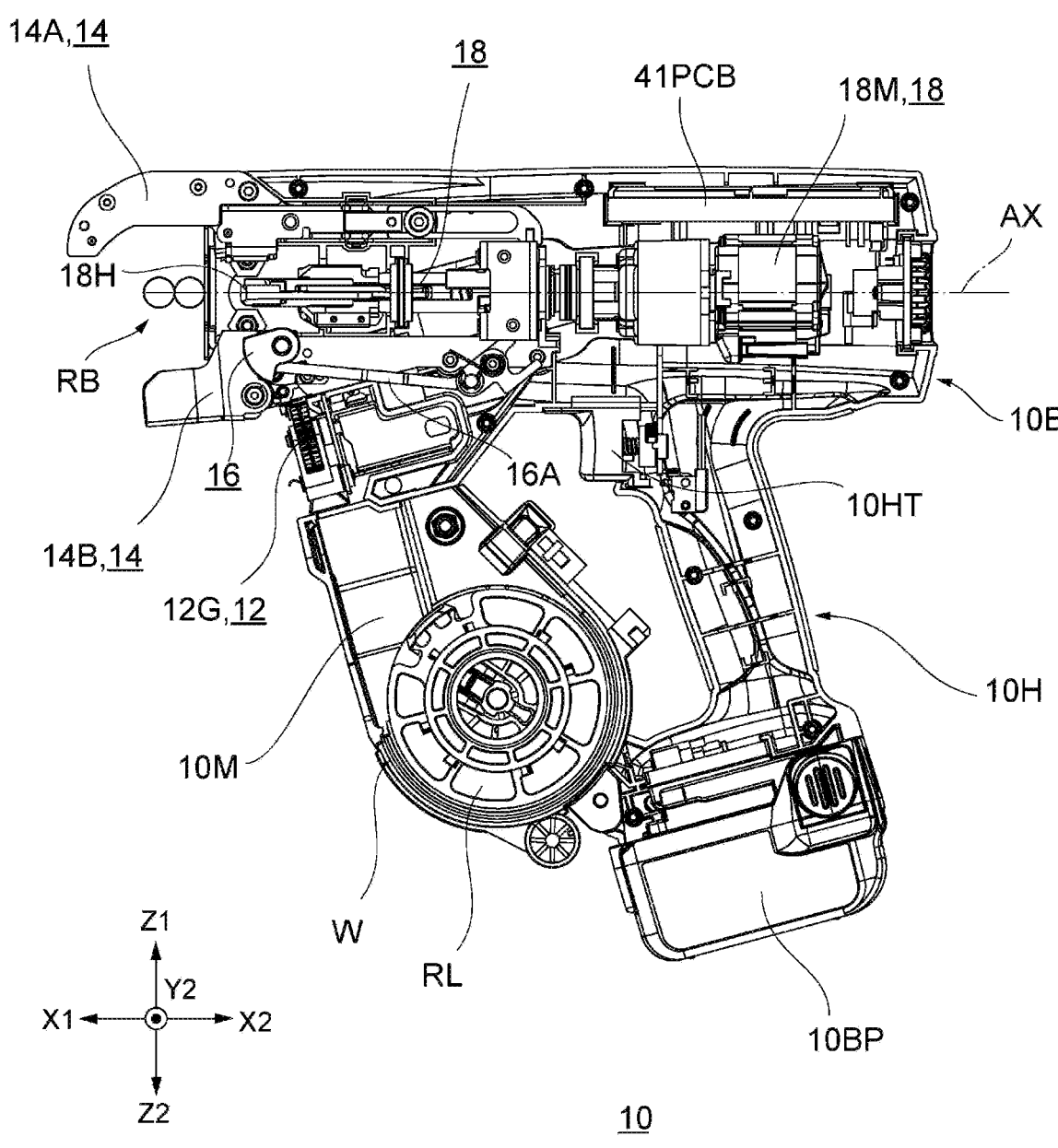
FIG. 2 is a cross-sectional view of the electric power tool according to the embodiment.

For the sake of convenience, a left-right direction of the paper surface of FIG. 2 may be referred to as a front-rear direction X (an example of a "first direction"), and in particular, a left direction of the paper surface may be referred to as a front side X1 and a right direction of the paper surface may be referred to as a rear side X2; an up-down direction of the paper surface may be referred to as an up-down direction Z (an example of a "second direction"), and in particular, an upper direction of the paper surface may be referred to as an upper side Z1 and a lower direction of the paper surface may be referred to as a lower side Z2; a direction perpendicular to the front-rear direction X and the up-down direction Z may be referred to as a right-left direction Y (an example of a "third direction"), and in particular, a right direction may be referred to as a right side Y1 and a left direction may be referred to as a left side Y2 when facing the front side X1. This is used for the purpose of explaining a relative directional relationship, and does not indicate an absolute direction.

Figure 1:
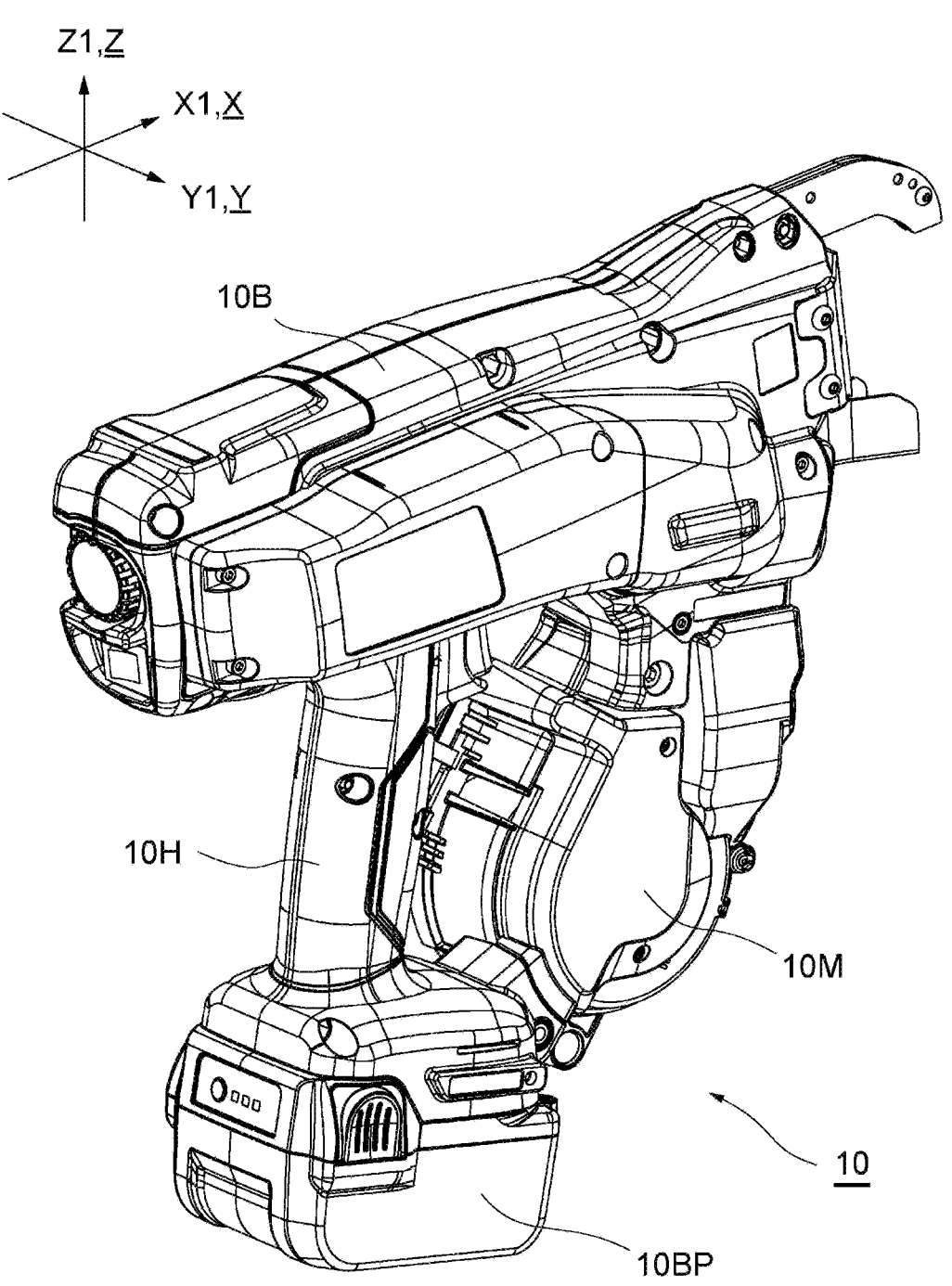
FIG. 1 is a perspective view of an electric power tool according to an embodiment.

Hereinafter, an embodiment in which the present invention is applied to a reinforcing bar binding machine that is an electric power tool will be described. FIG. 1 is a perspective view of a reinforcing bar binding machine 10 that is an electric power tool according to the present embodiment. FIG. 2 is a cross-sectional view obtained by cutting the reinforcing bar binding machine 10, which is the electric power tool, along a cross section perpendicular to the left-right direction Y.

The present invention can be widely applied to an electric power tool that has a communication function and performs work using an electric motor (motor), and can be applied to, for example, a drill, an impact driver, a nailer, a grinder, a reciprocating saw, and a polisher. The motor may be a brushless motor or a motor with brush.

[Basic Configuration of Electric Power Tool]

The reinforcing bar binding machine 10 according to the present embodiment is configured to bind two reinforcing bars RB or three or more reinforcing bars RB by feeding a wire W outward from an end thereof at the front side X1.

Specifically, the reinforcing bar binding machine 10 includes: a handle 10H to be gripped by a worker; a magazine 10M for accommodating the wire W; a wire feeding portion 12 for feeding the wire W outward from the end at the front side X1; a curl forming portion 14 constituting a traveling path of the wire W for winding the wire W around the reinforcing bar RB; a cutting portion 16 for cutting the wire W wound around the reinforcing bar RB; a binding portion 18 for twisting the wire W wound around the reinforcing bar RB; a tool controller that includes a drive controller 22 for controlling both a feeding motor 12M and a binding motor 18M that are provided in the wire feeding portion 12 and the binding portion 18, respectively; and a communication portion 30 that includes a communication device 32 for the reinforcing bar binding machine 10 to communicate with an external device, and a communication controller 34 for controlling the communication device 32.

In the reinforcing bar binding machine 10 of the present embodiment, the curl forming portion 14, the cutting portion 16, the binding portion 18, the tool controller, and the communication portion 30 constitute a main body 10B of the reinforcing bar binding machine 10. The magazine 10M is provided extending from a lower portion of the main body 10B at the front side X1 to the lower side Z2. The handle 10H is provided extending from a lower portion of the main body 10B at the rear side X2 to the lower side Z2. Thus, the magazine 10M is provided at the front side X1 with respect to the handle 10H, and the handle 10H is provided at the rear side X2 with respect to the magazine 10M. Further, a lower portion of the magazine 10M and a lower portion of the handle 10H are connected to each other. Hereinafter, the configurations will be described.

The reinforcing bar binding machine 10 includes the handle 10H that extends from the main body 10B to the lower side Z2. The handle 10H corresponds to a portion for a worker to grip the reinforcing bar binding machine 10. A lower end of the handle 10H is formed such that a main battery 10BP can be detachably attached thereto. A trigger 10HT is provided on a surface of the handle 10H facing the front side X1. The reinforcing bar binding machine 10 is configured such that, when the worker presses the trigger 10HT toward the rear side X2, the tool controller starts a control operation to start a binding operation as will be described later.

In the magazine 10M, a reel RL around which the linear wire W is wound is rotatably and detachably housed. Here, the reel RL is configured to feed one wire W or to simultaneously feed a plurality of wires W. The wire W is a linear body suitable for binding the reinforcing bar RB, such as a long metal wire having flexibility (including a coated metal wire).

The wire feeding portion 12 includes a pair of gears 12G configured to advance the wire W by rotating in different directions from each other with the wire W sandwiched therebetween, and the feeding motor 12M (an example of an "electric motor") that drives the gears 12G. The feeding motor 12M includes a rotor and a stator. The wire feeding portion 12 is configured to feed the wire W outward by rotating the rotor of the feeding motor 12M in a forward direction and configured to pull back the wire W by rotating the rotor in a reverse direction. The tool controller that controls the feeding motor 12M of the wire feeding portion 12 will be described later.

The curl forming portion 14 includes a curl guide 14A configured to curve and curl the wire W fed by the wire feeding portion 12, and an introducing guide 14B configured to introduce the wire W curled by the curl guide 14A to the binding portion 18. The curl guide 14A is configured to curve the wire W into a loop shape by advancing the wire W along an inner wall surface. Therefore, when the wire W is fed in a state where a plurality of reinforcing bars RB are arranged extending in the left-right direction Y in a space between the curl guide 14A and the introducing guide 14B, it is possible to wind the wire W around the reinforcing bars RB.

The cutting portion 16 includes a fixed blade, a movable blade that cuts the wire W in cooperation with the fixed blade, and a transmission mechanism 16A that transmits an operation of the binding portion 18 to the movable blade. The cutting portion 16 is configured to cut the wire W by a rotational operation of the movable blade with the fixed blade serving as a fulcrum shaft. The transmission mechanism 16A is configured to transmit the operation of the binding portion 18 to the movable blade and configured to rotate the movable blade in conjunction with a binding operation of the binding portion 18. Therefore, the transmission mechanism 16A rotates the movable blade in conjunction with the operation of the binding portion 18, whereby the wire W can be cut at a predetermined timing as will be described later.

The binding portion 18 includes a pair of hooks 18H configured to be openable and closable in order to clamp the wire W, a rotary shaft for rotating the pair of hooks 18H with the front-rear direction X as a rotation axis, a speed reducer configured to move the rotary shaft in a rotation axis direction (front-rear direction X) and configured to rotate the rotary shaft moved to the front side X1, and the binding motor 18M configured to be rotatable about a rotation axis AX.

The rotary shaft of the binding portion 18 rotates in a forward direction when the binding motor 18M rotates in a forward direction. A sliding portion is provided around the rotary shaft, and the sliding portion is configured to move toward the front side X1 when the rotary shaft rotates in the forward direction. The wire W fed by the feeding motor 12M in a state where the pair of hooks 18H are opened proceeds while being curved along inner wall surfaces of the curl guide 14A and the introducing guide 14B, and a leading end of the wire W passes through a gap between the pair of hooks 18H that are opened. In this state, when the binding motor 18M rotates in the forward direction and the rotary shaft rotates in the forward direction, the sliding portion moves to the front side X1 and the pair of hooks 18H close. Therefore, the pair of hooks 18H can clamp the wire W. When the binding motor 18M further rotates in the forward direction and the rotary shaft rotates in the forward direction to move the sliding portion to the front side X1, the movable blade is rotated by the transmission mechanism 16A to cut the wire W. When the binding motor 18M further rotates in the forward direction, the binding portion 18 bends the leading end of the cut wire W in a state where the wire W is clamped by the pair of hooks 18H. When the binding motor 18M further rotates in the forward direction, the rotary shaft rotates together with the sliding portion with the front-rear direction X as a rotation axis. The rotary shaft rotates in the state where the wire W is clamped by the pair of hooks 18H, whereby the pair of hooks 18H twist the wire W.

[Electric Circuit Configuration of Electric Power Tool]

Figure 3:
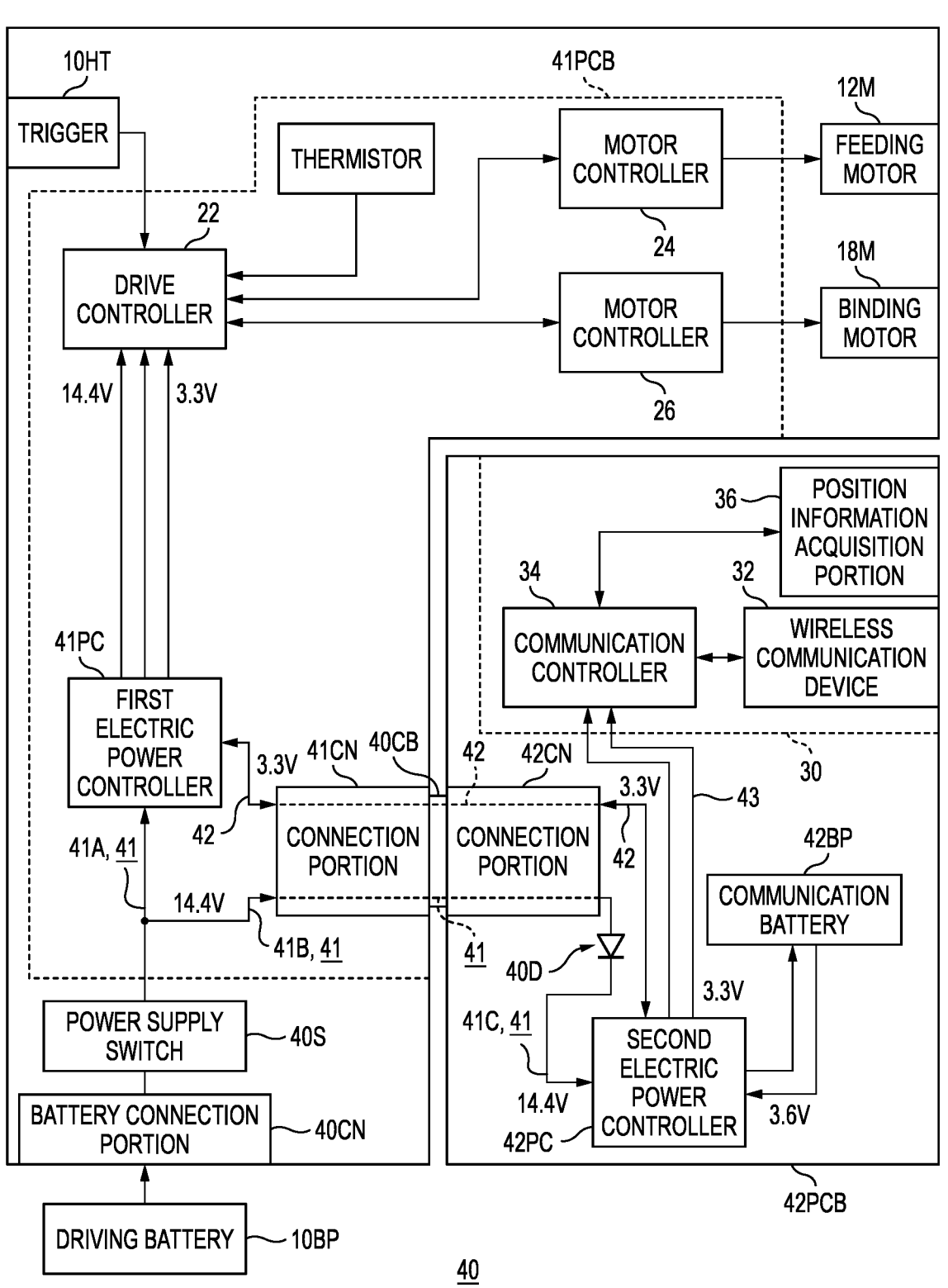
FIG. 3 is a block diagram illustrating an electric circuit configuration of the electric power tool according to the embodiment.

FIG. 3 is a block diagram illustrating an electric circuit configuration of the reinforcing bar binding machine 10 according to the present embodiment. In the electric circuit configuration of the reinforcing bar binding machine 10, a configuration for controlling the feeding motor 12M, a configuration for controlling the communication device 32, and a configuration for supplying electric power (voltage) to these configurations constitute a power supply device 40 of the present embodiment.

Specifically, the power supply device 40 according to the present embodiment includes: a battery connection portion 40CN for receiving supply of electric power (voltage) from the battery 10BP (which may be referred to as a "driving battery" or a "first battery"); a power supply switch 40S for turning on or off supply of electric power (voltage) supplied from the battery connection portion 40CN; a first electric power controller 41PC (an example of a "first voltage supply portion") that receives supply of electric power (voltage)

from the battery 10BP via the power supply switch 40S and that supplies, based on a first power supply voltage supplied from the battery 10BP, a first operating voltage for operating the drive controller 22 (an example of a "first controller"); the drive controller 22 that operates based on the first operating voltage and that generates a control signal for controlling the feeding motor 12M; and a motor controller 24 that controls a current flowing through the stator of the feeding motor 12M based on the control signal generated by the drive controller 22.

The battery 10BP is configured to supply electric power for operating at least the drive controller 22, the motor controller 24, the feeding motor 12M, the binding motor 18M, the communication controller 34, a wireless communication device 32, and a position information acquisition portion 36, the last three of which are to be described later. The battery 10BP is, for example, a rechargeable lithium ion secondary battery, and has a predetermined rated capacity, rated voltage, and rated current. For example, the battery 10BP has a rated capacity of 5.0 Ah, and is configured to supply a DC voltage having a rated value of 14.4 V. However, as will be described later, the DC voltage supplied from the battery 10BP decreases gradually accompanying power consumption of the battery 10BP.

The battery connection portion 40CN receives supply of the DC voltage from the battery 10BP and supplies the DC voltage to the first electric power controller 41PC. The power supply device 40 includes a first voltage line 41 that connects the battery connection portion 40CN and the first electric power controller 41PC, and the first power supply voltage of DC supplied from the battery 10BP is applied to the first voltage line 41.

According to an operation of a main power supply switch (not illustrated) of the reinforcing bar binding machine 10, the power supply switch 40S turns on or off the supply of electric power (voltage) that is supplied from the battery 10BP to the first electric power controller 41PC via the battery connection portion 40CN. Specifically, when a worker turns off the main power supply switch, the power supply switch 40S cuts off (turns off) the supply of electric power (voltage) from the battery 10BP to the first electric power controller 41PC, and when the worker turns on the main power supply switch, the power supply switch 40S permits (turns on) the supply of electric power (voltage) from the battery 10BP to the first electric power controller 41PC.

The first electric power controller 41PC generates, based on the first power supply voltage supplied from the battery 10BP, a voltage for operating circuit elements including the drive controller 22, and supplies the voltage to the circuit elements and the like. The first electric power controller 41PC (first voltage supply portion) is, for example, a circuit. For example, the first electric power controller 41PC is configured to generate, based on the first power supply voltage of 14.4 V supplied from the battery 10BP, a voltage of 3.3 V (an example of a "first operating voltage") that is an operating voltage of the drive controller 22, and configured to supply the voltage of 3.3 V to the drive controller 22, and configured to further supply the first power supply voltage (14.4 V) to the motor controller 24, a motor controller 26 and stators of respective motors. Here, supplying a voltage includes generating and supplying a voltage, and passing through and supplying a voltage without generating the voltage. The first electric power controller 41PC is configured to further generate an intermediate voltage higher than the first operating voltage and lower than the first power supply voltage and configured to supply the intermediate voltage to a different circuit element. The first electric power controller 41PC may include a booster circuit that is configured to generate a voltage higher than the first power supply voltage and configured to supply the generated voltage to a different circuit element.

The drive controller 22 operates based on a voltage of 3.3 V, for example, to generate a control signal for controlling the feeding motor 12M and supplies the control signal to the motor controller 24. In addition, the drive controller 22 is configured to control other actuators and the like of the reinforcing bar binding machine 10. Further, the drive controller 22 supplies the first power supply voltage, which is supplied from the first electric power controller 41PC, to (for example, a positive power supply line of) the motor controller 24. The drive controller 22 is further configured to receive a signal detecting that the trigger 10HT is pressed, and configured to start a motor control operation based on the signal. In addition, the drive controller 22 may be configured to receive a signal indicating a temperature of the electric power tool (reinforcing bar binding machine 10) from a thermistor and configured to control the feeding motor 12M based on the signal. For example, the drive controller 22 may generate different control signals in cases of a relatively high temperature and a relatively low temperature of the electric power tool and supply the control signals to the motor controller 24.

The drive controller 22 may include a single or a plurality of processors implemented by an integrated circuit (IC), and a memory (including a non-volatile semiconductor memory storing information in a non-transitory manner) storing firmware that is executed by the processor and that includes a computer command for executing various types of processing described in the present embodiment. The drive controller 22 (first controller) is, for example, a circuit. The drive controller 22 may be implemented by an IC such as an ASIC, an FPGA, a microcontroller, or the like. The drive controller 22 also functions as a part of the tool controller.

The motor controller 24 controls a current flowing through the stator of the feeding motor 12M based on a control signal generated by the drive controller 22. For example, the motor controller 24 may include a plurality of (for example, six) semiconductor elements connected in a three-phase bridge manner between a positive power supply line and a negative power supply line of a ground (reference potential), and a driver circuit for generating and supplying a gate signal (or a base signal) to a gate (or a base) of each semiconductor element.

The feeding motor 12M which is an electric motor according to the present embodiment includes, for example, a stator including three-phase windings connected to three-phase outputs of the motor controller 24, and a rotor configured to be rotatable in both forward and reverse directions according to a rotating magnetic field generated by a current flowing through the windings of the stator. The feeding motor 12M may further include, for example, a Hall element for detecting a position of the rotor, and the drive controller 22 may be configured to receive a position signal from the Hall element and configured to generate a control signal based on the position signal.

Similarly, although a detailed description is omitted, the power supply device 40 includes, for the binding motor 18M, a drive controller that generates a control signal for controlling the binding motor 18M and supplies the control signal to the motor controller 26 of the binding motor 18M, and the motor controller 26 that controls a current flowing through the stator of the binding motor 18M based on the control signal generated by the drive controller. The drive controller of the binding motor 18M and the drive controller 22 of the feeding motor 12M may be provided in the same semiconductor chip.

The power supply device 40 further includes a first circuit board 41PCB on which at least the first electric power controller 41PC, the drive controller 22, the motor controller 24, and the motor controller 26 are mounted. The first circuit board 41PCB is provided with a first connection portion 41CN (an example of a "first connector") for connecting to a second circuit board 42PCB described later via a cable 40CB. As illustrated in FIG. 3, the first voltage line 41 includes a first wiring 41A connecting the battery connection portion 40CN and the first electric power controller 41PC, and a second wiring 41B branching from the first wiring 41A and connected to the first connection portion 41CN. The power supply device 40 further includes a second voltage line 42 to which the first operating voltage (3.3 V) generated by the first electric power controller 41PC can be applied and that connects the first electric power controller 41PC and the first connection portion 41CN. The first circuit board 41PCB in FIG. 3 is drawn conceptually, and the actual first circuit board 41PCB is formed in a rectangular shape having two parallel long sides and two parallel short sides connecting ends of the long sides.

With the above configuration, it is possible to supply electric power for implementing the functions of the electric power tool. Next, a configuration related to a communication function of the electric power tool will be described.

As illustrated in FIG. 3, the power supply device 40 includes: a second battery 42BP for communication (also may be referred to as a "communication battery"); a second electric power controller 42PC (an example of a "second voltage supply portion") that is configured to supply, based on the first power supply voltage supplied from the main battery 10BP, a second operating voltage for operating the communication controller 34 (an example of a "second controller"), and that is configured to supply, based on a second power supply voltage supplied from the second battery 42BP in cases such as one where the main battery 10BP is removed, the second operating voltage for operating the communication controller 34; and the communication controller 34 that controls the wireless communication device 32 (an example of the "communication device 32") and the position information acquisition portion 36 based on the second operating voltage supplied from the second electric power controller 42PC.

The communication portion 30 of the electric power tool includes the position information acquisition portion 36 that acquires position information of the electric power tool and that supplies the position information to the communication controller 34, and the wireless communication device 32 for wirelessly transmitting information to and receiving information from an external device.

The position information acquisition portion 36 includes, for example, an antenna configured to receive a signal from a positioning satellite of GPS (or another GNSS such as GLONASS), and a reception circuit that acquires position information of the electric power tool based on the signal received by the antenna.

For example, the wireless communication device 32 includes: an antenna that is configured to transmit information to and receive information from a remote base station according to a predetermined standard by using a frequency band of a licensed band or an unlicensed band based on the LPWA technology; an RFIC that is configured to demodulate an analog signal received by the antenna and configured to supply the demodulated analog signal to a baseband IC, and that is configured to modulate a signal supplied from the baseband IC into an analog signal and configured to transmit the analog signal from the antenna; and the baseband IC that decodes or encodes a signal acquired from the RFIC according to a protocol defined by the standard and transmits and receives information. The communication device 32 may be compatible with a short-distance wireless communication system such as Bluetooth (registered trademark) or a wireless LAN.

With the above-described configuration, for example, the communication controller 34 is configured to provide the position information of the electric power tool to an external device by transmitting, via the wireless communication device 32, the position information acquired by the position information acquisition portion 36. The communication controller 34 (second controller) is, for example, a circuit. In the present embodiment, the communication controller 34, the RFIC, and the baseband IC may be stacked in the same semiconductor package. The communication controller 34 and the baseband IC may be formed of the same semiconductor chip.

The power supply device 40 further includes the second circuit board 42PCB on which at least the second electric power controller 42PC, the communication controller 34, the communication device 32, and the position information acquisition portion 36 are mounted. The second circuit board 42PCB is provided with a second connection portion 42CN (an example of a "second connector") for connecting to the first circuit board 41PCB via the cable 40CB. As illustrated in FIG. 3, with respect to the first voltage line 41, the first wiring 41A and the second wiring 41B are formed on the first circuit board 41PCB, and a third wiring 41C electrically connected to the first wiring 41A and the second wiring 41B via the connectors is formed on the second circuit board 42PCB. With respect to the second voltage line 42, a wiring connecting the first connection portion 41CN and the first electric power controller 41PC is formed on the first circuit board 41PCB, and a wiring electrically connected to the former wiring via the connectors and connected to the second electric power controller 42PC is formed on the second circuit board 42PCB.

The second battery 42BP further provided in the power supply device 40 supplies electric power for operating at least the communication controller 34, the wireless communication device 32, and the position information acquisition portion 36. The second battery 42BP is, for example, a rechargeable lithium ion secondary battery, and has a predetermined rated capacity, rated voltage, and rated current. For example, the second battery 42BP has a smaller rated capacity than the main battery 10BP, and is configured to supply a DC voltage having a rated value of 3.6 V (an example of the "second power supply voltage"). In addition, since the second battery 42BP is housed in a housing constituting the main body 10B of the electric power tool, unlike the main battery 10BP, the second battery 42BP is not provided to be easily detachable but is integrally fixed to the second circuit board 42PCB. The second battery 42BP may not be integrally fixed to the second circuit board 42PCB, and may be detachably provided on the second circuit board 42PCB, for example.

The second electric power controller 42PC is configured to generate, based on a power supply voltage supplied from the battery 10BP, a voltage for operating circuit elements including the communication controller 34 and the drive controller 22, and configured to supply the voltage to the circuit elements and the like. The second electric power controller 42PC (second voltage supply portion) is, for example, a circuit. For example, the second electric power controller 42PC generates, based on a power supply voltage of 14.4 V supplied from the battery 10BP, a voltage (an example of a "second operating voltage") of 3.3 V that is an operating voltage of the communication controller 34, and supplies the voltage to the communication controller 34 by a third voltage line 43 connecting the second electric power controller 42PC and the communication controller 34, and similarly, generates a predetermined operating voltage and supplies the predetermined operating voltage to the position information acquisition portion 36 and the wireless communication device 32.

In addition, the second electric power controller 42PC is configured to generate, based on a DC voltage of 3.6 V corresponding to the second power supply voltage supplied from the second battery 42BP, an operating voltage for operating circuit elements and the like, and configured to supply the generated operating voltage to the circuit elements including the communication controller 34 and the drive controller 22. Here, the second electric power controller 42PC includes a booster circuit that is configured to generate a voltage higher than the second power supply voltage in order to operate the antenna. However, the reinforcing bar binding machine 10 may not necessarily include the booster circuit. In the present embodiment, since an operating voltage of the antenna is higher than the second power supply voltage, the reinforcing bar binding machine 10 includes a booster circuit such as a charge pump circuit. However, for example, when a circuit element to be driven by electric power of the second battery 42BP is selected or when the second power supply voltage is set such that an operating voltage of the circuit element is equal to or lower than the second power supply voltage, the reinforcing bar binding machine 10 may not necessarily include the booster circuit.

With the above configuration, when the main battery 10BP is removed, the second electric power controller 42PC operates the drive controller 22, the communication controller 34, the position information acquisition portion 36, and the wireless communication device 32 based on the second power supply voltage supplied from the second battery 42BP, thereby enabling wireless transmission and reception of information with an external device. Accordingly, even when the main battery 10BP is removed, the communication controller 34 can provide the position information of the electric power tool to the external device by transmitting, via the wireless communication device 32, the position information acquired by the position information acquisition portion 36, and can store update data for updating the firmware of the drive controller 22 that is received via the wireless communication device 32 in, for example, a non-volatile semiconductor memory constituting the drive controller 22.

Further, the second electric power controller 42PC is configured to generate, based on the power supply voltage supplied from the main battery 10BP, a charging voltage for charging the second battery 42BP, and configured to charge the second battery 42BP. Accordingly, when the battery 10BP is attached, the power supply device 40 according to the present embodiment is configured to operate the drive controller 22, the motor controller 24, the motor controller 26, the motors (the feeding motor 12M and the binding motor 18M), the communication controller 34, the position information acquisition portion 36, and the wireless communication device 32 based on the electric power supplied from the battery 10BP and configured to charge the second battery 42BP based on the electric power supplied from the battery 10BP. When the main battery 10BP is removed, the power supply device 40 is configured to operate the drive controller 22, the communication controller 34, the position information acquisition portion 36, and the wireless communication device 32 based on the electric power supplied from the second battery 42BP. As described above, since supplying a voltage includes passing through and supplying a voltage without generating the voltage, a voltage serving as a power supply may be supplied to the communication controller 34 and the like by directly connecting a wiring to which an output voltage from the second battery 42BP is applied, to a power supply terminal of the communication controller 34 and the like, or the voltage serving as a power supply may be supplied to the drive controller 22 and the like by directly connecting a wiring to which an output voltage from the second electric power controller 42PC is applied, to a power supply terminal of the drive controller 22 and the like.

The power supply device 40 further includes the second circuit board 42PCB on which at least the second electric power controller 42PC, the communication controller 34, the position information acquisition portion 36, and the wireless communication device 32 are mounted. The second circuit board 42PCB is provided with a second connection portion 42CN (an example of a "second connector") for connecting to the first circuit board 41PCB via the cable 40CB.

As illustrated in FIG. 3, the first voltage line 41 to which the power supply voltage from the battery 10BP is applied not only supplies a voltage to the first electric power controller 41PC via the power supply switch 40S, but also supplies a voltage to the second power controller 42PC by including a wiring that is connected to the second electric power controller 42PC via the first connection portion 41CN of the first circuit board 41PCB, the cable 40CB, and the second connection portion 42CN of the second circuit board 42PCB.

Further, the second voltage line 42, to which the first operating voltage (3.3 V) generated by the first electric power controller 41PC is applied, includes a wiring connected to the second electric power controller 42PC and the communication controller 34 via the connection portion of the first circuit board 41PCB, the cable 40CB, and the connection portion of the second circuit board 42PCB. Accordingly, when the main battery 10BP is attached, the second voltage line 42 is configured to supply electric power (voltage and current) in a direction from the first electric power controller 41PC to the second electric power controller 42PC, and when the main battery 10BP is removed, the second voltage line 42 is configured to supply electric power (voltage and current) in a direction from the second electric controller 42PC to the first electric power controller 41PC.

Here, the third wiring 41C of the first voltage line 41 provided on the second circuit board 42PCB is provided with a diode (an example of a "backflow suppression circuit") having an anode connected to a first electric power controller 41PC side and a cathode connected to a second electric power controller 42PC side. The diode serves as a circuit capable of permitting a current to flow from the first electric power controller 41PC to the second electric power controller 42PC and suppressing a current from flowing from the second electric power controller 42PC to the first electric power controller 41PC. The backflow suppression circuit may be provided in the second wiring 41B of the first voltage line 41 provided on the first circuit board 41PCB.

By providing the backflow suppression circuit, it is possible to suppress the flow from the second battery 42BP to the first electric power controller 41PC via the second electric power controller 42PC, and thus it is possible to effectively use the main battery 10BP and the second battery 42BP.

The second voltage line 42 is preferably configured to permit a current to flow from the first electric power controller 41PC (first voltage supply portion) to the second electric power controller 42PC (second voltage supply portion) and configured to permit a current to flow from the second electric power controller 42PC (second voltage supply portion) to the first electric power controller 41PC (first voltage supply portion).

With such a configuration, the electric power (voltage) can be supplied to the power supply terminal of the drive controller 22 of the first circuit board 41PCB via the second voltage line 42 that connects the second circuit board 42PCB which is a communication board, the second connector, the first connector, and the first electric power controller 41PC.

Therefore, when the main battery 10BP is removed, the drive controller 22 can be operated. For example, the drive controller 22 can update firmware that is a control program. Accordingly, it is possible to reduce a situation where the work of a worker has to be interrupted for updating the firmware of the drive controller 22, thereby improving work efficiency of the worker.

The second voltage line 42 may be provided so as to connect the first connector and the power supply terminal of the drive controller 22 of the first circuit board 41PCB directly without using the first electric power controller 41PC as an intermediary.

In addition, the power supply device 40 according to the present embodiment has a configuration in which the first circuit board 41PCB and the second circuit board 42PCB are connected to each other via the cable 40CB (including a wiring constituting a part of the first voltage line 41 and a wiring constituting a part of the second voltage line 42). Therefore, the first circuit board 41PCB and the second circuit board 42PCB can be disposed at different positions. For example, the first circuit board 41PCB may be disposed at the upper side Z1 of the binding motor 18M such that the circuit board is substantially perpendicular to the up-down direction Z, and the second circuit board 42PCB may be disposed in the left-right direction Y (for example, at the right side Y1) of the binding motor 18M such that the circuit board is substantially perpendicular to the left-right direction Y. With such a configuration, the two circuit boards can be disposed so as to surround a motor (one of the binding motor 18M and the feeding motor 12M) in a state of being substantially perpendicular to each other. Here, the two circuit boards may be arranged such that a distance between a rotation axis of the motor (for example, the rotation axis AX of the binding motor 18M) and the second circuit board 42PCB is larger than a distance between the rotation axis of the motor and the first circuit board 41PCB. With such a configuration, the second circuit board 42PCB can be disposed at a position away from the motor as compared with the first circuit board 41PCB, and thus it is possible to lower a possibility that noise caused by rotation of the motor has a bad influence on communication; the first circuit board 41PCB can be disposed at a position closer to the motor as compared with the second circuit board 42PCB, and thus it is possible to reduce a distance between the motor controller 24 (or the motor controller 26) and the stator of the motor.

The power supply device further includes the drive controller 22 mounted on the first circuit board 41PCB for controlling the feeding motor 12M and the binding motor 18M that are the electric motors of the electric power tool

10, and the communication controller 34 mounted on the second circuit board 42PCB for controlling the communication device 32. With such a configuration, in the electric power tool, wireless communication by the communication controller 34 can be performed at the same time and in parallel with control of the drive controller 22 over the electric motors. Therefore, the communication controller 34 can provide operation information, the position information, and the like of the electric power tool to an external device in real time. In addition, the communication of the communication controller 34 does not interfere with the control of the drive controller 22 over the electric motors.

The inventors of the present application have focused on a point that there is a possibility that the communication controller 34 cannot be controlled by providing the drive controller 22 and the communication controller 34 as separate chips.

That is, since the communication controller 34 can operate based on the second power supply voltage supplied from the second battery 42BP even when the main battery 10BP is removed, and the second battery 42BP is chargeable when the main battery 10BP is attached, the communication controller 34 is always operable. Therefore, even when the communication controller 34 falls into a control-impossible state, the communication controller 34 cannot be reset in accordance with turning-on or turning-off of the power supply switch 40S.

Therefore, the communication controller 34 of the present application is configured to actively perform a reset operation when a predetermined condition is satisfied.

Specifically, the drive controller 22 is configured to transmit a predetermined signal to the communication controller 34, and the communication controller 34 is configured to transmit a predetermined response signal for the predetermined signal to the drive controller 22 when receiving the predetermined signal from the drive controller 22. Further, when the predetermined response signal is not received from the communication controller 34 within a predetermined period after the predetermined signal is transmitted to the communication controller 34, the drive controller 22 transmits a reset signal for executing the reset operation to the communication controller 34.

With such a configuration, it can be determined that the communication controller 34 falls into the control-impossible state based on the fact that the drive controller 22 does not receive the response signal for the predetermined signal from the communication controller 34. The drive controller 22 transmits the reset signal to the communication controller 34 that falls into the control-impossible state, so that the communication controller 34 can execute the reset operation.

[Operations of Reinforcing Bar Binding Machine]

Hereinafter, operations of the reinforcing bar binding machine 10 will be described. As described above, the present embodiment can be applied to an electric power tool other than the reinforcing bar binding machine 10.

Figure 4:
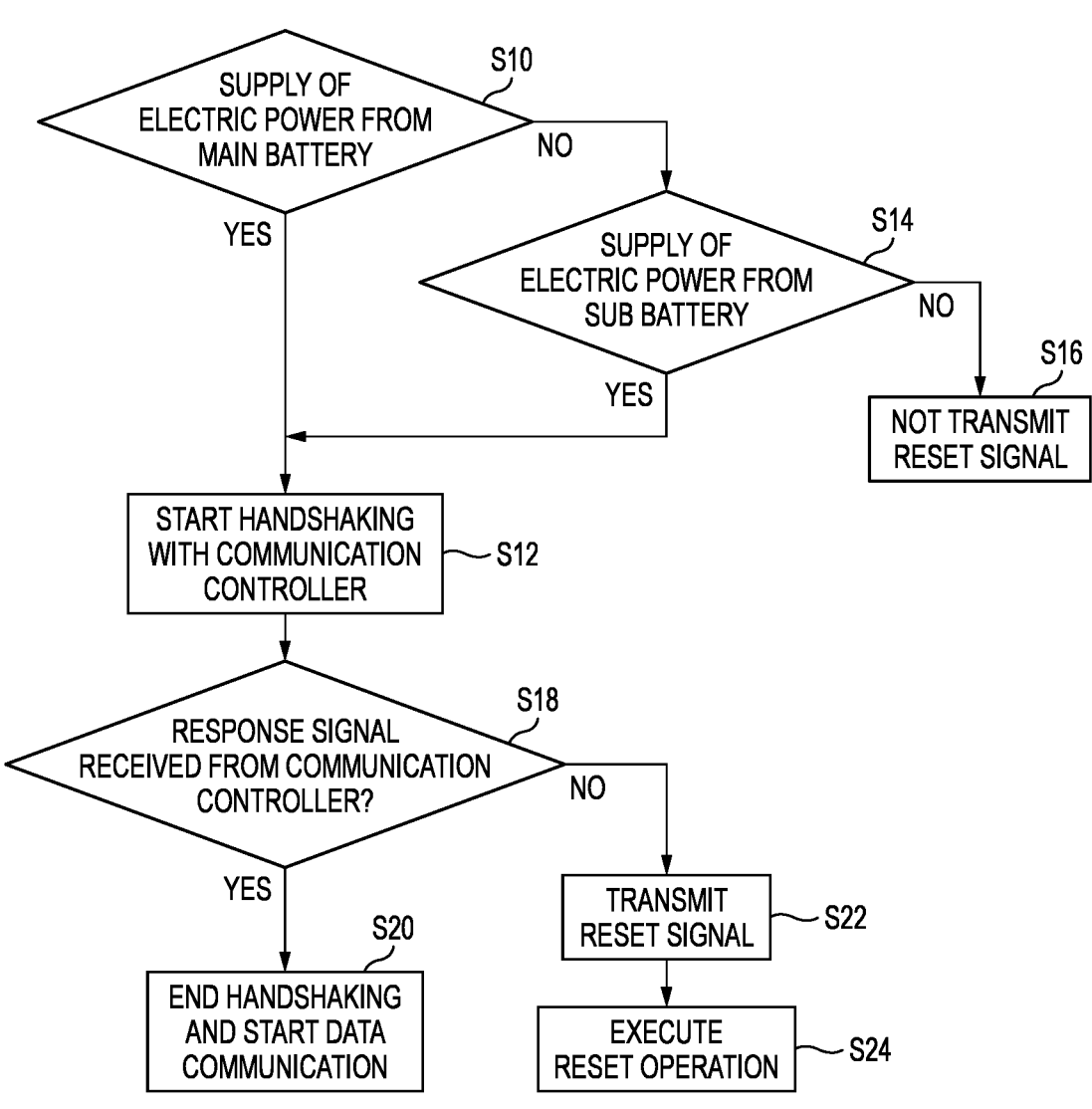
FIG. 4 is a flowchart illustrating operations of the electric power tool according to the embodiment.

FIG. 4 is a flowchart illustrating the reset operation of the reinforcing bar binding machine 10.

First, the drive controller 22 determines whether electric power is supplied from the main battery 10BP (step S10). When the worker attaches the main battery 10BP to the lower end of the handle 10H and turns on the main power supply switch, the drive controller 22 determines that electric power is supplied from the main battery 10BP (step S10: YES). The reinforcing bar binding machine 10 is in a state of allowing work to be performed therewith. When the predetermined condition is satisfied in this state, the drive controller 22 is configured to execute handshaking with the communication controller 34 (step S12).

With the reinforcing bar binding machine 10 in the state of allowing work to be performed therewith, a DC voltage from the first battery is applied to the first voltage line 41, and thus the first voltage line 41 has a voltage of 14.4 V. When the worker presses the trigger 10HT in this state, the drive controller 22 starts drive control of the motors (the binding motor 18M and the feeding motor 12M).

With the reinforcing bar binding machine 10 in the state of allowing work to be performed therewith, the main battery 10BP supplies electric power to the communication portion 30 at the same time. Specifically, the first electric power controller 41PC is configured to generate a voltage of 3.3 V, which is the operating voltage of the communication controller 34, based on a DC voltage of 14.4 V corresponding to the first power supply voltage supplied from the battery 10BP, and configured to supply the voltage of 3.3V to the communication controller 34 via the second voltage line 42. Therefore, the communication controller 34 starts the control over the communication device 32. For example, the communication controller 34 transmits, from the antenna of the communication device 32, the position information acquired by the position information acquisition portion 36, thereby transmitting the position information of the reinforcing bar binding machine 10 to an external device, and transmits operation information of the reinforcing bar binding machine 10 received from the drive controller 22 to the external device.

As described above, the reinforcing bar binding machine 10 is configured to execute the drive control of the electric motor and the control of the communication device in parallel. At this time, since the drive controller 22 and the communication controller 34 are separated from each other due to being mounted on different circuit boards, the communication device 32 can perform communication in a state where influence of noise accompanying the rotation of the electric motors is reduced.

On the other hand, when the work is finished, the worker removes the main battery 10BP from the lower end of the handle 10H or turns off the power supply switch 40S. When the main battery 10BP is removed or when the power supply switch 40S is turned off, the electric motors (the feeding motor 12M and the binding motor 18M) of the reinforcing bar binding machine 10 do not operate and are in a non-operating state. At this time, the drive controller 22 determines that electric power is not supplied from the main battery 10BP (step S10: NO), and then determines whether electric power is supplied from the sub second battery 42BP (step S14). When the drive controller 22 determines that electric power is supplied from the sub second battery 42BP (step S14: YES), the communication device 32 of the reinforcing bar binding machine 10 is in a state of being able to perform communication with the sub second battery 42BP as a power supply. When the predetermined condition is satisfied in this state, the drive controller 22 is configured to execute handshaking with the communication controller 34 (step S12).

That is, in a state where the reinforcing bar binding machine 10 can perform work and electric power is supplied from the main battery 10BP, and in a state where the reinforcing bar binding machine 10 can perform communication and electric power is supplied from the sub second battery 42BP, the drive controller 22 is configured to perform the reset operation when the predetermined condition is satisfied.

On the other hand, when the drive controller 22 determines that electric power is not supplied from the sub second battery 42BP (step S14: NO), the drive controller 22 does not transmit the reset signal (step S16).

Next, a handshaking operation for determining whether the reset operation is necessary is started. Specifically, the second electric power controller 42PC applies the operating voltage (3.3 V) of the drive controller 22 to the second voltage line 42 based on the first power supply voltage (work-allowing state) supplied from the battery 10BP (work-allowing state) or the second power supply voltage (communication-enabled state) supplied from the second battery 42BP (communication-enabled state), and supplies electric power to the drive controller 22 (step S20). At the same time, the second electric power controller 42PC applies the operating voltage (3.3 V) of the communication controller 34 to the third voltage line 43 based on the first power supply voltage (work-allowing state) supplied from the battery 10BP (work-allowing state) or the second power supply voltage (communication-enabled state) supplied from the second battery 42BP (communication-enabled state), and similarly, the second electric power controller 42PC generates an operating voltage for operating circuit elements such as an antenna of the communication portion 30, and supplies the operating voltage to the circuit elements including the communication controller 34 and the drive controller 22. Even in the communication-enabled state, since electric power is supplied from the second battery 42BP to the drive controller 22 which is a circuit element on the first circuit board 41PCB, the drive controller 22 can operate together with the communication portion 30. The reinforcing bar binding machine 10 may be configured to execute the handshaking operation for determining whether the reset operation is necessary, for example, at a predetermined time point (an example of "when a predetermined condition is satisfied").

Next, the drive controller 22 transmits the predetermined signal to the communication controller 34. Then, the drive controller 22 determines whether the predetermined response signal is received from the communication controller 34 within a predetermined period of time (step S18).

When the drive controller 22 receives the predetermined response signal from the communication controller 34 within the predetermined period of time (step S18: YES), it is determined that the communication controller 34 does not fall into the control-impossible state, and the handshaking operation ends (step S20). Thereafter, the communication controller 34 may start communication.

On the other hand, when the drive controller 22 does not receive the predetermined response signal from the communication controller 34 within the predetermined period of time (step S18: NO), it is determined that the communication controller 34 falls into the control-impossible state, and thus the drive controller 22 transmits a reset command for executing the reset operation to the communication controller 34 (step S22).

The communication controller 34 receives the reset command and executes the reset operation (step S24).

As described above, according to the present embodiment, it is possible to provide a power supply device for an electric power tool and an electric power tool that are less likely to be affected by noise and can perform communication in real time.

In addition, it is possible to suppress the communication controller from being unintentionally brought into the control-impossible state. Further, since the operation (for example, the handshaking operation) for determining whether the reset operation is necessary is executed using the sub battery after the main battery is removed, the work of the worker is not disturbed.

The present embodiment can be variously modified. For example, when at least one of the following conditions is further satisfied, the communication controller 34 may execute the reset operation.

Condition 1 is that the number of times of working of the electric power tool (for example, the number of times of binding) or the number of times of pressing a trigger (for example, the trigger 10HT) is equal to or greater than a predetermined threshold. For example, the drive controller 22 may be configured to count at least one of the number of times of binding performed by the reinforcing bar binding machine 10 or the number of times of pressing the trigger, and configured to transmit the reset command to the communication controller 34 when the number of times of binding or the number of times of pressing is equal to or greater than the predetermined threshold.

Condition 2 is that the trigger (for example, the trigger 10HT) is not pressed. The drive controller 22 may be configured to transmit the reset command to the communication controller 34 when the trigger 10HT is not pressed (including not being pressed within a predetermined period of time after a previous pressing of the trigger 10HT).

Condition 3 is that the number of pieces of data or the amount of data of the operation information of the electric power tool stored in the memory is equal to or greater than a predetermined threshold. As described above, the drive controller 22 includes a volatile or non-volatile memory. Therefore, the drive controller 22 may be configured to transmit the reset command to the communication controller 34 when the number of pieces of data or the amount of data of the operation information of the electric power tool stored in the memory is equal to or greater than the predetermined threshold.

Condition 4 is that all or a part of a consumable article (for example, a wire) used by the electric power tool is used. For example, the drive controller 22 may be configured to detect the amount of the consumable article (remaining amount of the wire W) loaded in the reinforcing bar binding machine 10, and the drive controller 22 may be configured to transmit the reset command to the communication controller 34 when the consumable article is all used.

Condition 5 is that an operation error of the electric power tool occurs. For example, the reinforcing bar binding machine 10 is configured to detect an error that a desired curl is not given by the curl guide 14A or the introducing guide 14B. Therefore, for example, the drive controller 22 may be configured to transmit the reset command to the communication controller 34 when an operation error is detected.

Condition 6 is that an operating condition of the electric power tool is changed. For example, the reinforcing bar binding machine 10 includes a torque adjusting portion for changing a binding force. Therefore, for example, the drive controller 22 may be configured to transmit the reset command to the communication controller 34 when an operating condition of the electric power tool is changed (when the binding force is changed by torque adjustment).

The condition 7 is that the power supply is turned off since the electric power tool is not operated for a certain period of time. For example, the reinforcing bar binding machine 10 may be configured such that the power supply switch 40S is automatically turned off when the reinforcing bar binding machine 10 is not operated for the certain period of time. At this time, the drive controller 22 may be configured to transmit the reset command to the communication controller

34 when the power supply is turned off since the electric power tool is not operated for the certain period of time.

Condition 8 is that the main battery 10BP does not supply electric power. The drive controller 22 may be configured to transmit the reset command to the communication controller 34 when the main battery 10BP is removed or when electric power is not supplied since a battery residual is exhausted although the main battery 10BP is attached.

First Modification

Hereinafter, a modification of the above-described embodiment will be described. Elements that exhibit the same or similar configurations, functions or effects as those of the above-described embodiment are denoted by the same reference signs or names, and a description thereof will be omitted or simplified as appropriate, and different portions will be mainly described. It is also possible to further change the above-described embodiment and modifications thereof within the ordinary creativity expected of a person skilled in the art.

In the above-described embodiment, the communication controller 34 is configured to execute the reset operation when receiving the reset command from the drive controller 22. The communication device 32 of the electric power tool according to the present modification is configured to receive a reset command transmitted from an external device, and the communication controller 34 is configured to execute a reset operation based on the reset command received by the communication device 32.

For example, the external device may be configured to transmit the reset command to the electric power tool at a time point (for example, 2:00 am) when work is not performed. The communication device 32 may be configured to receive the reset command from the external device after the main battery is removed, and the communication controller 34 may be configured to execute the reset operation based on the reset command received by the communication device 32.

According to the above configuration as well, it is possible to suppress the communication controller from being unintentionally brought into a control-impossible state. In addition, since the communication device 32 is configured to receive the reset command at the time point when work is not performed, the work of a worker is not disturbed.

Second Modification

An electric power tool according to the present modification includes a reset button and a reset circuit. The reset circuit is configured to transmit reset commands to the drive controller 22 and the communication controller 34 respectively when a worker presses the reset button, and the drive controller 22 and the communication controller 34 are configured to receive the reset command from the reset circuit and configured to execute a reset operation.

According to the above configuration as well, it is possible to suppress the communication controller from being unintentionally brought into a control-impossible state. In addition, it is possible to reliably perform the reset operation. The configuration of the present modification may be applied to an electric power tool in combination with configurations of other embodiments and modifications.

Third Modification

An electric power tool according to the present modification includes a second power supply switch provided in a power supply line connecting a communication battery 42BP and the second electric power controller 42PC. A power-on reset circuit (POR circuit) is built in the communication controller 34.

When executing a reset operation in the electric power tool, the second power supply switch cuts off supply of electric power from the communication battery 42BP to the second electric power controller 42PC (an example of "supply of the second power supply voltage"). The POR circuit of the communication controller 34 is configured to execute the reset operation when the supply of electric power is cut off.

In the embodiment and the modifications described above, a condition and timing for the drive controller 22, which is a first controller, to execute the reset operation may be different from a condition and timing for the communication controller 34, which is a second controller, to execute the reset operation.

For example, the communication controller 34 may not execute the reset operation when the drive controller 22 executes the reset operation. On the other hand, the drive controller 22 may not execute the reset operation when the communication controller 34 executes the reset operation.

For example, the drive controller 22 may execute the reset operation by the built-in POR circuit when the battery 42BP is attached and the supply of electric power is started, and at this time, the communication controller 34 to which electric power is already supplied may not execute the reset operation. In addition, at the time of performing the handshaking of the first embodiment, the communication controller 34 may execute the reset operation, and at this time, the drive controller 22 may not execute the reset operation.

In addition, the present invention can be variously modified. For example, the reset operation may be executed every time a certain time point is reached. Further, the reset operation may be executed when a predetermined period of time elapses since a previous reset operation is executed. In addition, the communication controller 34 may execute the reset operation at a timing when a supply source of electric power is switched from the battery 42BP to the battery 10BP, or at a timing when the supply source of electric power is switched from the battery 10BP to the battery 42BP.

For example, the supply of electric power may be cut off for a predetermined period of time at the timing at which the supply source of electric power is switched, and the built-in POR circuit of the communication controller 34 may be provided. Accordingly, the reset operation may be executed at the timing at which the supply source of electric power is switched.

Various modifications can be made without departing from the gist of the present invention. For example, it is possible to add other known techniques to a part of the constituent elements of an embodiment within the scope of the ordinary creativity of a person skilled in the art. A part of constituent elements of an embodiment may be replaced with other known techniques. For example, the drive controller and the communication controller can operate at different voltages.

What is claimed is:

1. An electric power tool comprising:
an electric motor;
a first battery;
a second battery;
a first controller configured to control the electric motor at a first operating voltage supplied based on a first power supply voltage supplied from the first battery;
a communication device; and a second controller configured to control the communication device at a second operating voltage supplied based on the first power supply voltage supplied from the first battery, and configured to control the communication device at the second operating voltage supplied based on a second power supply voltage supplied from the second battery when the first power supply voltage is not supplied from the first battery,
wherein:
the second controller is configured to execute a reset operation when a predetermined condition is satisfied,
when a second predetermined condition different from the predetermined condition is satisfied in the first controller, a reset signal for executing the reset operation is supplied to the first controller,
when the predetermined condition is satisfied, the first controller does not execute the reset operation and the second controller executes the reset operation, and
when the second predetermined condition is satisfied, the first controller executes the reset operation and the second controller does not execute the reset operation.

2. The electric power tool according to claim 1, wherein the first controller is configured to transmit a signal to the second controller,
the second controller is configured to transmit a response signal for the signal to the first controller, and
the first controller is configured to supply, to the second controller, a reset signal for causing the second controller to execute the reset operation when the response signal as the predetermined condition is not received.

3. The electric power tool according to claim 1, wherein when the communication device receives a reset command as the predetermined condition, a reset signal for executing the reset operation is supplied to the second controller.

4. The electric power tool according to claim 1, further comprising:
a switch configured to cut off supply of the second power supply voltage from the second battery,
wherein when the supply of the second power supply voltage from the second battery is cut off by the switch when the predetermined condition is satisfied, the second controller executes the reset operation.

5. The electric power tool according to claim 1, wherein the first controller and the second controller are mounted on different circuit boards.

6. The electric power tool according to claim 1, wherein when the predetermined condition is satisfied, the electric power tool is configured to execute an operation for determining whether the reset operation is necessary.

7. The electric power tool according to claim 6, wherein when the electric power tool determines that the second controller falls into a control-impossible state, the first controller transmits a reset signal for executing the reset operation to the second controller.

8. An electric power tool comprising:
an electric motor;
a first battery;
a second battery;
a first controller configured to control the electric motor at a first operating voltage supplied based on a first power supply voltage supplied from the first battery;
a communication device; and a second controller configured to control the communication device at a second operating voltage supplied based on the first power supply voltage supplied from the first battery, and configured to control the communication device at the second operating voltage supplied based on a second power supply voltage supplied from the second battery when the first power supply voltage is not supplied from the first battery, wherein:

the second controller is configured to execute a reset operation when a predetermined condition is satisfied, and the electric power tool further comprises:

a first voltage supply portion configured to supply, based on the first power supply voltage supplied from the first battery, the first operating voltage for operating the first controller;

a second voltage supply portion configured to supply, based on the first power supply voltage supplied from the first battery, the second operating voltage for operating the second controller, and configured to supply, based on the second power supply voltage supplied from the second battery, the second operating voltage for operating the second controller;

a first voltage line configured to connect the first voltage supply portion and the second voltage supply portion and configured to supply the first power supply voltage;

a second voltage line configured to connect the first voltage supply portion and the second voltage supply portion and configured to supply a second voltage lower than the first power supply voltage;

a first circuit board on which the first controller and the first voltage supply portion are mounted;

a second circuit board on which the second controller and the second voltage supply portion are mounted;

a first connector provided on the first circuit board;

a second connector provided on the second circuit board; and a cable configured to connect the first connector and the second connector, and including a power supply line constituting at least a part of the first voltage line and a power supply line constituting at least a part of the second voltage line.

* * * * *